(12) United States Patent
Nakatsugawa et al.

(10) Patent No.: US 7,946,497 B2
(45) Date of Patent: May 24, 2011

(54) NON-CONTACT IC, INFORMATION PROCESSING APPARATUS, READER/WRITER, AND USE RESTRICTION METHOD

(75) Inventors: Hiroyuki Nakatsugawa, Kawasaki (JP); Kazuhiro Hosaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1477 days.

(21) Appl. No.: 11/283,730

(22) Filed: Nov. 22, 2005

(65) Prior Publication Data
US 2007/0029392 A1 Feb. 8, 2007

(30) Foreign Application Priority Data
Aug. 4, 2005 (JP) .................. 2005-226663

(51) Int. Cl.
*G06K 19/06* (2006.01)
*G06K 5/00* (2006.01)
*G06K 19/00* (2006.01)
(52) U.S. Cl. ......... 235/492; 235/380; 235/382; 235/487
(58) Field of Classification Search .................. 235/439, 235/441, 492, 379–382, 487
See application file for complete search history.

(56) References Cited

U.S. PATENT DOCUMENTS

| 5,461,217 A * | 10/1995 | Claus ........................... 235/380 |
| 7,178,737 B2 * | 2/2007 | Ohyama ...................... 235/492 |
| 7,336,974 B2 * | 2/2008 | Choi ............................ 455/558 |
| 2003/0006280 A1 * | 1/2003 | Seita et al. .................... 235/380 |
| 2003/0174839 A1 * | 9/2003 | Yamagata et al. ............ 380/270 |
| 2005/0141256 A1 * | 6/2005 | Yamazaki et al. ............ 365/96 |
| 2008/0150728 A1 * | 6/2008 | Hoshina ..................... 340/572.8 |

FOREIGN PATENT DOCUMENTS

| JP | 2002-222442 | 8/2002 |
| JP | 2003-16398 | 1/2003 |
| JP | 2004-348475 | 12/2004 |
| JP | 2005-12354 | 1/2005 |
| WO | WO 03052544 A2 * | 6/2003 |

* cited by examiner

*Primary Examiner* — Thien M. Le
*Assistant Examiner* — April A Taylor
(74) *Attorney, Agent, or Firm* — Kratz, Quintos & Hanson, LLP (57) ABSTRACT

A non-contact IC can exchange information with a reader/writer by wireless communication. When the non-contact IC receives from the reader/writer a command indicative of restricting use of the non-contact IC, the non-contact IC sets itself in a state of restricted use. When in the state of restricted use, the non-contact IC can not exchange information with a reader/writer.

9 Claims, 10 Drawing Sheets

| CHIP MANUFACTURE NUMBER | TRADER A | TRADER B | TRADER C |
|---|---|---|---|
| 0x010301 | ○ | ○ | ○ |
| 0x010302 | × | ○ | × |
| 0x010304 | ○ | × | × |
| 0x010701 | × | ○ | ○ |
| 0x020305 | × | ○ | × |
| 0x00(stopper) | − | − | − |

FIG.8

| |
|---|
| 0x010301 |
| 0x010302 |
| 0x010701 |
| 0x020305 |

NON-CONTACT IC, INFORMATION PROCESSING APPARATUS, READER/WRITER, AND USE RESTRICTION METHOD

BACKGROUND OF THE INVENTION

1. Field of the Invention

The present invention relates to controlling usage of a non-contact IC.

2. Description of the Related Art

Recently, non-contact integrated circuits (ICs) are becoming widespread in many forms such as IC cards, and are used for a variety of purposes. For example, non-contact ICs are incorporated in information processing apparatuses such as mobile telephone sets. In mobile telephone sets, the non-contact ICs function as so-called electronic money. The electronic money can be used to purchase goods or train or bus tickets or commuter passes.

A device that includes a non-contact IC needs only to be held near an apparatus for reading and writing information known as a reader/writer to make purchases of products, making it remarkably convenient for the user. A drawback is that, if the device is lost or stolen, the electronic money can easily be misused by a third party.

Japanese Patent Application Laid-open No. 2004-348475 discloses a technique that restricts use of the functions of a non-contact IC in a device according to a predetermined signal from a base station so as to prevent a third party from misusing the mobile telephone set. Moreover, Japanese Patent Application Laid-open No. 2003-16398 discloses a technique that first makes authentication based on a security code and only permits use of the non-contact IC after proper authentication.

However, according to the technique disclosed in Japanese Patent Application Laid-open No. 2004-348475, the use of the mobile telephone set cannot be restricted while the power of the mobile telephone set is switched off or while the mobile telephone set is in an area where no signal can reach it. Moreover, in the technique disclosed in Japanese Patent Application Laid-open No. 2003-16398, there is a problem of a severe decline in convenience, which is one of the main advantages of a device including a non-contact IC.

SUMMARY OF THE INVENTION

It is an object of the present invention to at least solve the problems in the conventional technology.

According to an aspect of the present invention, a non-contact integrated circuit (IC) includes a wireless communications unit configured to exchange information with a reader/writer by wireless communication; a storage unit configured to store therein information; a restriction setting unit configured to, upon receiving a use restriction request indicative of restricting use of the non-contact IC from the reader/writer, store in the storage unit a restriction command for setting the non-contact IC to a state of restricted use; and a controller configured to, when the restriction command is present in the storage unit, control the wireless communications unit so that the wireless communications unit does not exchanged information with the reader/writer.

According to another aspect of the present invention, an information processing apparatus includes a non-contact IC according to the present invention.

According to still another aspect of the present invention, a use restriction method of controlling use of a non-contact integrated circuit (IC), the non-contact IC configured to exchange information with a reader/writer by wireless communication includes the reader/writer determining, based on restriction information, whether use of the non-contact IC is to be restricted; the reader/writer transmitting a command to the non-contact IC when it is determined at the determining that the use of the non-contact IC is to be restricted; and the non-contact IC setting itself in a state of restricted use upon receiving the command.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings.

A mobile telephone set is described as an example of a device that can include a non-contact IC, the use restriction method of the present invention can be implemented on other devices such as laptop computers, PDAs, IC cards, and the like.

Figure 11:
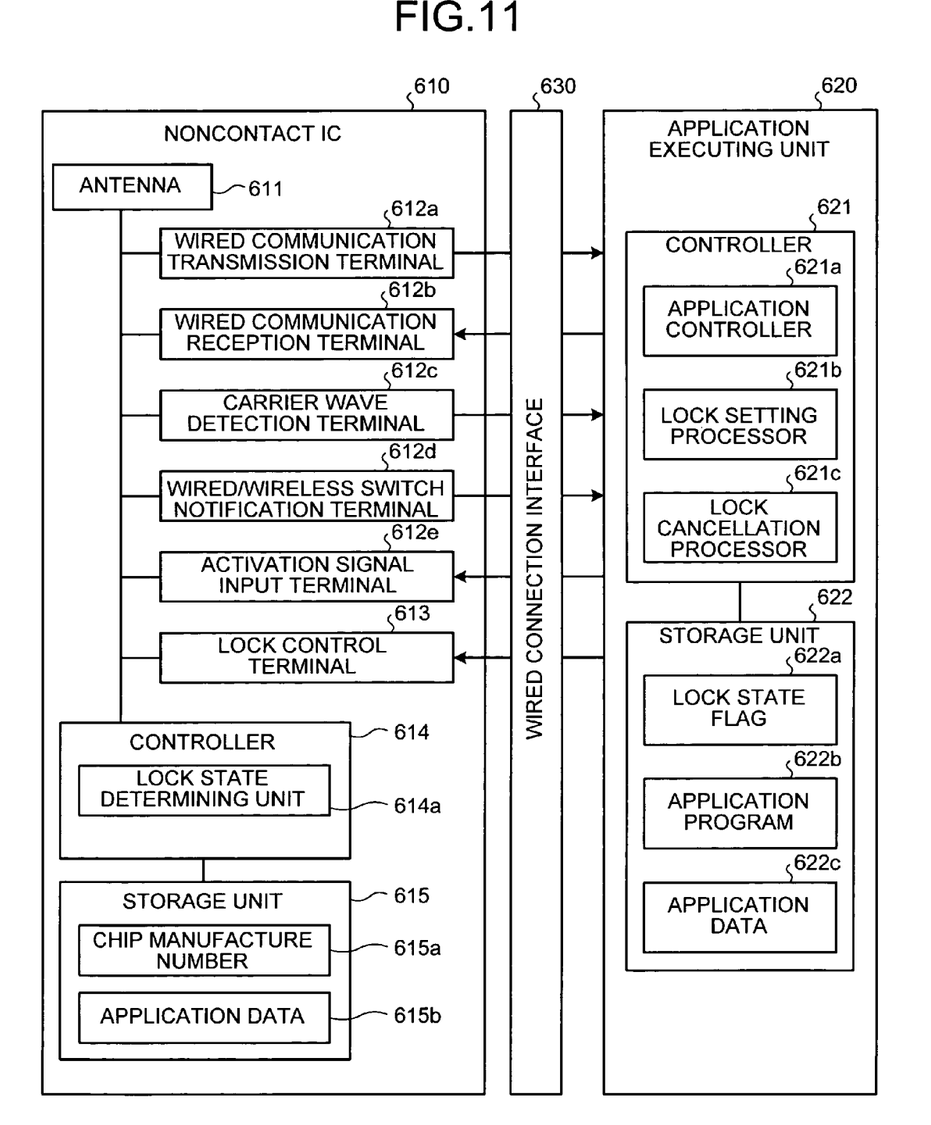
FIG. 11 is a block diagram of the configuration of a non-contact IC and an application executing unit in a conventional mobile telephone set.

FIG. 11 is a block diagram of an exemplary non-contact IC and an application executing unit that can be employed in a mobile telephone set according to an embodiment of the present invention. A non-contact IC 610 and an application executing unit 620 are connected by a wired connection interface 630.

The application executing unit 620 executes various types of applications, and includes a controller 621 and a storage unit 622. The controller 621 controls the entire application executing unit 620, and includes an application controller 621a, a lock setting processor 621b, and a lock cancellation processor 621c.

The application controller 621a controls the execution of various types of applications. An example of such applications is a settlement application in which the non-contact IC 610 us used for payment or to purchase goods. When an application is executed, information is transmitted from the application executing unit 620 to the non-contact IC 610 via the wired connection interface 630.

Specifically, the application controller 621a expands the application program 622b stored in the storage unit 622 or an application program that is downloaded from a network in the memory of the controller 621, and the program is then executed.

The lock setting processor 621b locks the non-contact IC 610, i.e., sets it to a state in which it does not function. The lock cancellation processor 621c cancels the locked state of the non-contact IC 610.

When the non-contact IC 610 is locked, no information whatsoever can be transmitted/received by wireless communication. Wired communication via the wired connection interface 630 also ceases, with the exception of communication relating to canceling the lock. Locking the non-contact IC 610 prevents a third party from misusing its functions.

A lock control signal, transmitted from the application executing unit 620 to a lock control terminal 613, controls whether the non-contact IC 610 is locked or unlocked. Specifically, the non-contact IC 610 is unlocked when the signal is High and locked when the signal is Low.

The lock setting processor 621b and the lock cancellation processor 621c are controlled by applications executed by the application executing unit 620. For example, a lock setting application monitors signals from the base station and, if a signal indicating that the non-contact IC mounted on the mobile telephone set needs to be locked is received, controls the lock setting processor 621b so as to lock the non-contact IC 610. When the user performs a predetermined operation, a lock cancellation application controls the lock cancellation processor 621c so as to unlock the non-contact IC 610.

The storage unit 622 stores various types of information including a lock state flag 622a, an application program 622b, and application data 622c.

The lock state flag 622a indicates whether to lock the non-contact IC 610, and is set by the lock setting processor 621b and the lock cancellation processor 621c. Specifically, when "1" is set as the lock state flag 622a, a low logical-level lock control signal is transmitted from the application executing unit 620 to the lock control terminal 613. As a result, the non-contact IC 610 is locked. On the other hand, when "0" is set as the lock state flag 622a, a high logical-level lock control signal is transmitted from the application executing unit 620 to the lock control terminal 613. As a result, the non-contact IC 610 is unlocked.

The application program 622b is executed when necessary by the controller 621. The application data 622c is used in processing of the application program 622b and the like. While only one application program is shown in FIG. 11, the storage unit 622 can store a plurality of application programs.

The non-contact IC 610 enables data to be input and output by wireless communication using electromagnetic waves and by wired communications via the wired connection interface 630. The non-contact IC 610 includes an antenna 611, a wired communication transmission terminal 612a, a wired communication reception terminal 612b, a carrier wave detection terminal 612c, a wired/wireless switch notification terminal 612d, an activation signal input terminal 612e, the lock control terminal 613, a controller 614, and a storage unit 615.

The antenna 611 performs wireless communications by electromagnetic waves. The wired communication transmission terminal 612a transmits data by wired communication, and the wired communication reception terminal 612b receives data by wired communication. The carrier wave detection terminal 612c uses wired communication to notify an outside unit that the non-contact IC 610 has detected a carrier wave transmitted from a reader/writer, i.e. that communication with the reader/writer has become possible.

The wired/wireless switch notification terminal 612d uses wired communication to notify an outside unit when the non-contact IC 610 has switched from wired communication to wireless communication, or vice versa. The activation signal input terminal 612e receives a signal from an outside unit that requests the start of wired communication.

As already mentioned, the lock control terminal 613 controls the switch between the lock/unlocked states of the non-contact IC 610 from the outside.

The controller 614 controls the entire non-contact IC 610, and includes a lock state determining unit 614a. The lock state determining unit 614a is a processor that determines whether the non-contact IC 610 is locked based on a signal received by the lock control terminal 613, and, when it determines that the non-contact IC 610 is locked, prohibits transmission/reception of information other than information that is approved beforehand.

The storage unit 615 stores various types of information including a chip manufacture number 615a and application data 615b. The chip manufacture number 615a is a specific number of the non-contact IC 610 and is used in distinguishing it from other non-contact ICs. The application data 615b is used in processing of applications executed by the application executing unit 620, applications executed in the reader/writer, or the like.

In the above-mentioned mobile telephone set, it is determined whether to lock the non-contact IC 610 based on the value of the lock state flag 622a of the application executing unit 620, and this value is controlled by applications and the like executed by the application executing unit 620.

Sometimes a user invalidates the communication function of the mobile telephone set by removing a user identity module (UIM) card or the like. When the communication function of the mobile telephone set is invalidated in this manner, in the above-mentioned technique, the non-contact IC 610 can not be locked from the outside. Similarly, when power switch of the mobile telephone set if OFF, i.e., when the application executing unit 620 is not in a position to perform its regular functions, the non-contact IC 610 can not be locked from the outside.

Figure 1:
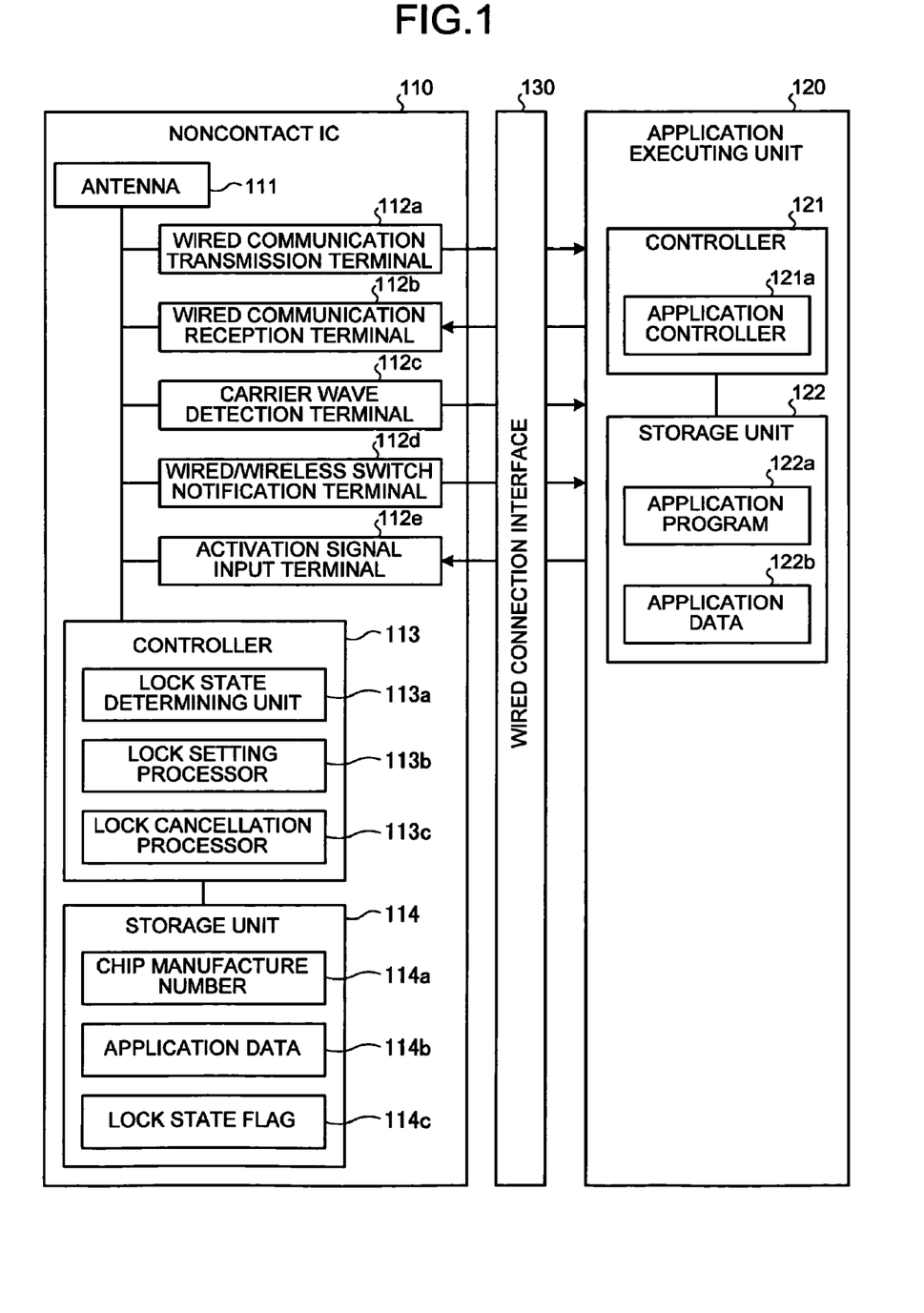
FIG. 1 is a block diagram of the configuration of a non-contact IC and an application executing unit in a mobile telephone set according to an embodiment of the present invention.

FIG. 1 is a block diagram of another exemplary configuration of a non-contact IC and an application executing unit that can be used in a mobile telephone set 100 according to another embodiment of the present invention. A non-contact IC 110 and an application executing unit 120 are wire-connected via a wired connection interface 130.

The application executing unit 120 is a processor that executes various types of applications, and includes a controller 121 and a storage unit 122. The controller 121 controls the entire application executing unit 120, and includes an application controller 121a.

The application controller 121a controls the execution of various types of applications, for example, a settlement application using the non-contact IC 110 for payment to purchase a product, or the like. When an application uses the non-contact IC 110, various types of information are transmitted via the wired connection interface 130.

Specifically, the application controller 121a expands an application program 122a stored in the storage unit 122, or an application program that is downloaded from a network, in the memory of the controller 121, and the program is then executed.

The storage unit 122 stores various types of information, and includes an application program 122a and application data 122b.

The application program 122a is executed when necessary by the controller 121. The application-data 122b is used in processing of the application program 122a and the like. While only one application program is shown in FIG. 1, the storage unit 122 can store a plurality of application programs.

The non-contact IC 110 enables information to be input and output by wireless communication using electromagnetic waves and by wired communications via the wired connection interface 130. The non-contact IC 110 includes an antenna 111, a wired communication transmission terminal 112a, a wired communication reception terminal 112b, a carrier wave detection terminal 112c, a wired/wireless switch notification terminal 112d, an activation signal input terminal 112e, the controller 121, and a storage unit 114.

The antenna 111 performs wireless communications using electromagnetic waves. The terminals 112a to 112e correspond to the terminals 612a to 612e of FIG. 11, and have similar functions. Therefore, redundant explanations thereof will be omitted.

The controller 113 controls the entire non-contact IC 110, and includes a lock state determining unit 113a, a lock setting processor 113b, and a lock cancellation processor 113c. The lock state determining unit 113a is a processor that determines whether the non-contact IC 110 is locked based on the value of a lock state flag 114c of the storage unit 114, and, when it determines that the non-contact IC 110 is locked, prohibits transmission/reception of information other than information that is approved beforehand.

The lock setting processor 113b sets the non-contact IC 110 to the locked state, i.e. to a state where its functions are stopped. The lock setting processor 113b sets the lock state flag 114c to the locked state when a lock request is received by wireless communication via the antenna 111.

When the lock state flag 114c is set to the locked state, the non-contact IC 110 does not transmit/receive any information by wireless communication. Wired communication via the wired connection interface 130 also ceases, with the exception of communication relating to the canceling the locked state. Locking the non-contact IC 110 prevents a third party from misusing its functions.

The lock cancellation processor 113c cancels the locked state of the non-contact IC 110. When the lock cancellation processor 113c receives a lock cancellation request by wired communication via the wired connection interface 130, it sets the lock state flag 114c to the unlocked state.

The storage unit 114 stores various types of information, including a chip manufacture number 114a, application data 114b, and the lock state flag 114c. The chip manufacture number 114a is a specific number of the non-contact IC 110 and is used in distinguishing it from other non-contact ICs. The application data 114b is used in processing of applications executed by the application executing unit 120, applications executed in the reader/writer, or the like.

The lock state flag 114c indicates whether to lock the non-contact IC 11b, and is set by the lock setting processor 113b and the lock cancellation processor 113c. Specifically, the non-contact IC 110 is locked when "1" is set in the lock state flag 114c, and is unlocked when "0" is set.

As explained above, in the mobile telephone set of this embodiment, the non-contact IC 110 autonomously sets its own lock state based on predetermined signals received via the antenna 111. This enables it to shift to the locked state by receiving a lock request from the reader/writer, irrespective of the states of other parts such as the application executing unit.

Figure 2:
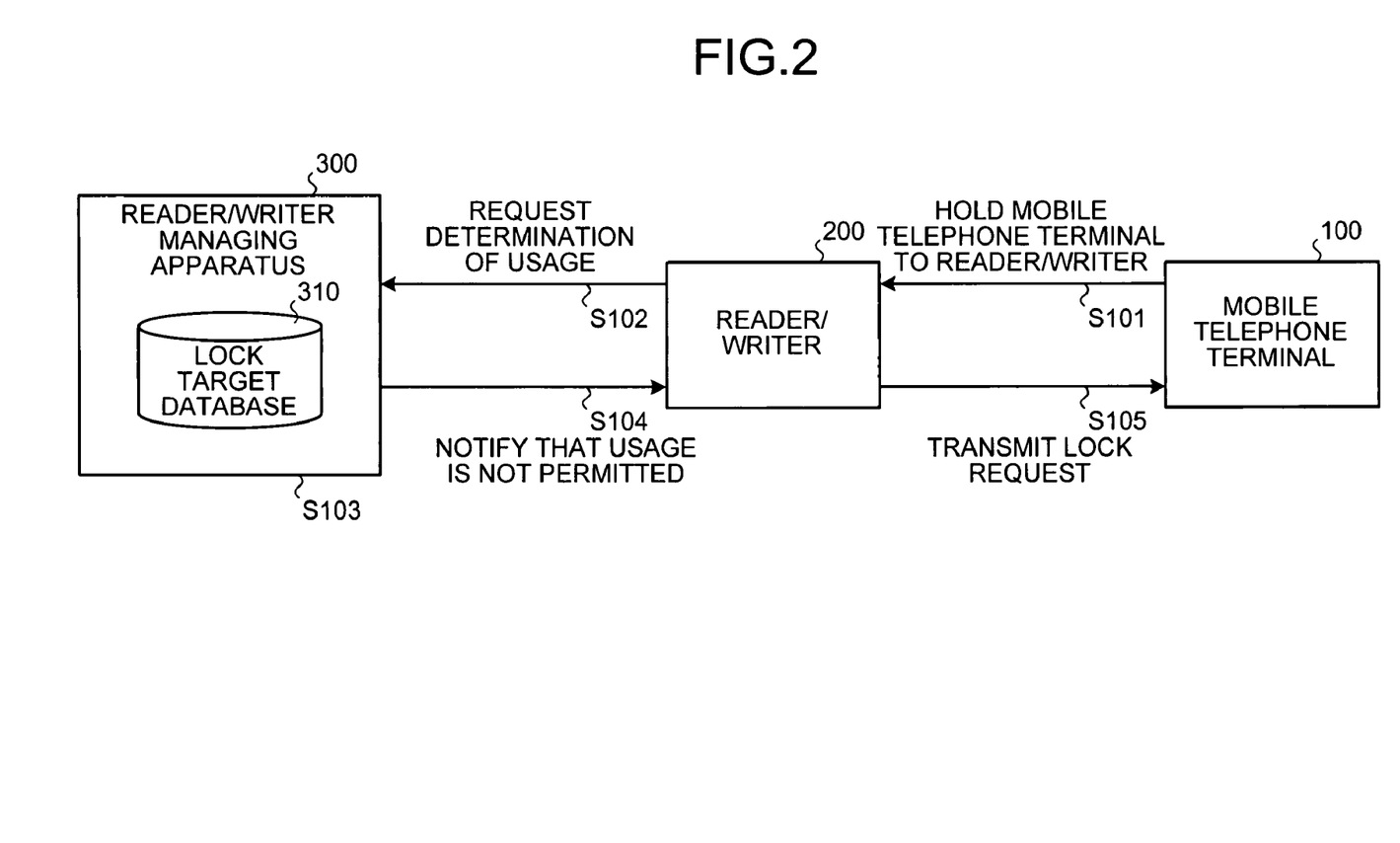
FIG. 2 is an explanatory diagram for explaining a use restriction method of the non-contact IC in the mobile telephone set according to the embodiment.

A method of controlling usage (hereinafter, "use restriction method" of the non-contact IC 110 in the mobile telephone set 100 according to this embodiment will be explained next. FIG. 2 is an explanatory diagram for explaining the use restriction method. The use restriction method is realized using the mobile telephone set 100, a reader/writer 200, and a reader/writer managing apparatus 300.

The mobile telephone set 100 includes the non-contact IC 110. The reader/writer 200 is an apparatus that reads/writes various types of information to/from the non-contact IC 110 of the mobile telephone set 100 by wireless communication. Electromagnetic waves can be used to perform the wireless communication.

The reader/writer managing apparatus 300 manages the reader/writer 200 that is connected by a network or the like, and includes a lock target database 310. The lock target database 310 stores chip manufacture numbers of non-contact ICs that are to be locked.

Suppose that a third party illicitly obtains the mobile telephone set 100 and attempts to illicitly receive a service by using the non-contact IC 110. To receive this service, the third party holds the mobile telephone set 100 up to the reader/writer 200 (step S101). The reader/writer 200 obtains the chip manufacture number from the mobile telephone set 100 and sends a request to the reader/writer managing apparatus 300 to determine whether the non-contact IC having this chip manufacture number can use this service (step S102).

Upon receiving the request, the reader/writer managing apparatus 300 obtains the chip manufacture number mentioned in the request and cross-checks it against the lock target database 310 (step S103). It is assumed here that a legitimate owner of the mobile telephone set 100 is someone who has completed an application for restricted use of the mobile telephone set 100, and that the chip manufacture number of the non-contact IC 110 mounted in the mobile telephone set 100 is already registered in the lock target database 310.

When the reader/writer managing apparatus 300 finds the chip manufacture number for which a request to confirm whether usage is permitted is made in the lock target database 310, it responds by notifying the reader/writer 200 that usage is not permitted (step S104). When the reader/writer 200 receives the notification that the usage is not permitted, it transmits a lock request to the mobile telephone set 100 (step S105).

When the non-contact IC 110 of the mobile telephone set 100 receives this lock request, it sets the lock state flag to "1". As a result, the mobile telephone set 100 gets locked. Because the mobile telephone set 100 is in locked state, its non-contact IC 110 cannot receive and/or output any information other than that for canceling the lock.

While in the example of FIG. 2 includes one reader/writer 200 and one reader/writer managing apparatus 300, the reader/writer managing apparatus 300 can manage a plurality of reader/writers. Also, while the reader/writer 200 and the reader/writer managing apparatus 300 are arranged as independent apparatuses in FIG. 2, they can be integrated into a single apparatus.

Figure 3:
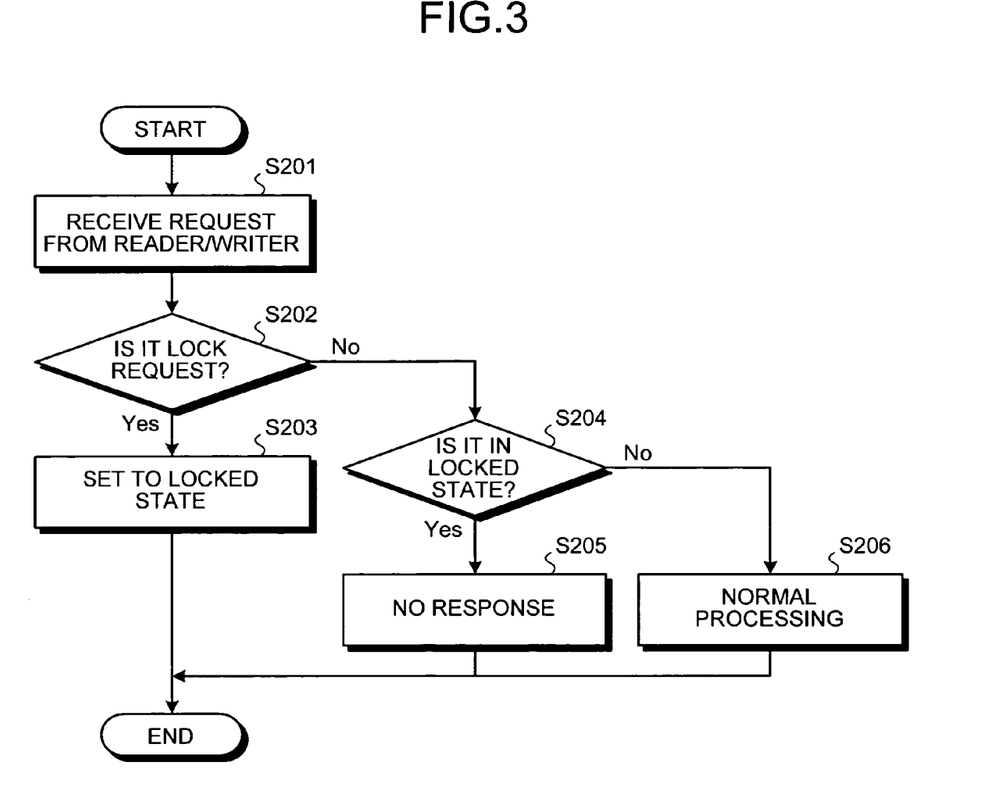
FIG. 3 is a flowchart of a process procedure performed by the non-contact IC shown in FIG. 1 when the non-contact IC receives a request from a reader/writer.

A process procedure performed by the non-contact IC 110 shown in FIG. 1 will be explained next. FIG. 3 is a flowchart of a process procedure when the non-contact IC 110 of FIG. 1 receives a request from a reader/writer.

When the non-contact IC 110 receives a request from the reader/writer (step S201), it identifies the nature of the request. If the request is a lock request (step S202: Yes), the non-contact IC 110 sets itself to the locked state (step S203).

When the request is not a lock request (step S202: No), if the non-contact IC 110 is already in a locked state (step S204: Yes), it does not respond to the reader/writer (step S205). However, if the non-contact IC 110 is not in a locked state (step S204: No), it executes normal processing according to the content of the request (step S206).

Figure 4:
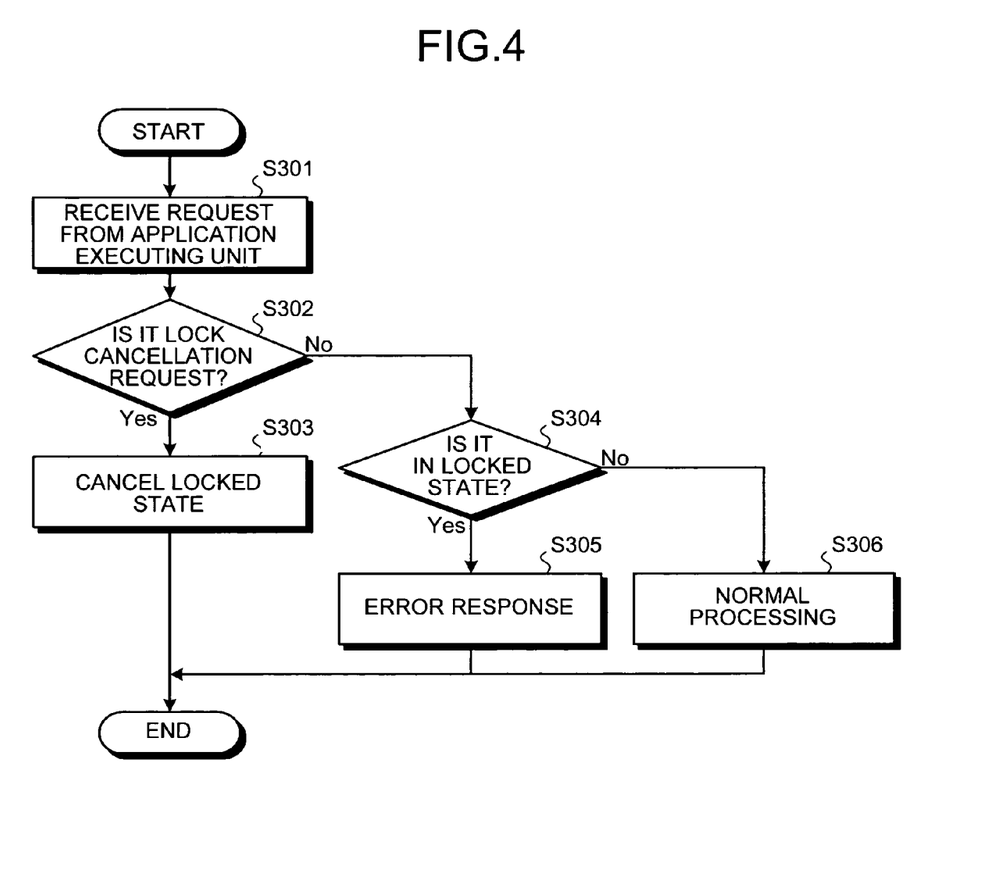
FIG. 4 is a flowchart of a process procedure performed by the non-contact IC shown in FIG. 1 when the non-contact IC receives a request from an application executing unit shown in FIG. 1.

FIG. 4 is a flowchart of a process procedure when the non-contact IC 110 shown in FIG. 1 receives a request from the application executing unit 120.

As shown in FIG. 4, when the non-contact IC 110 receives the request from the application executing unit 120 (step S301), it identifies the nature of the request. If the request is a lock cancellation request (step S302: Yes), the non-contact IC 110 cancels its own locked state (step S303).

When the request is not a lock cancellation request (step S302: No), if the non-contact IC 110 is already in a locked state (step S304: Yes), it responds by sending an error to the application executing unit 120 (step S305). However, if the non-contact IC 110 is not a locked state (step S304: No), it executes normal processing according to the content of the request (step S306).

While the example of FIG. 4 assumes that a lock cancellation request cannot be made illicitly from the outside, to strictly check the propriety of the lock cancellation, it is preferable to provide an authentication mechanism that uses a security code or the like in the non-contact IC 110 and cancel the lock only when authentication information included in the lock cancellation request is successfully authenticated by this authentication mechanism.

Figure 5:
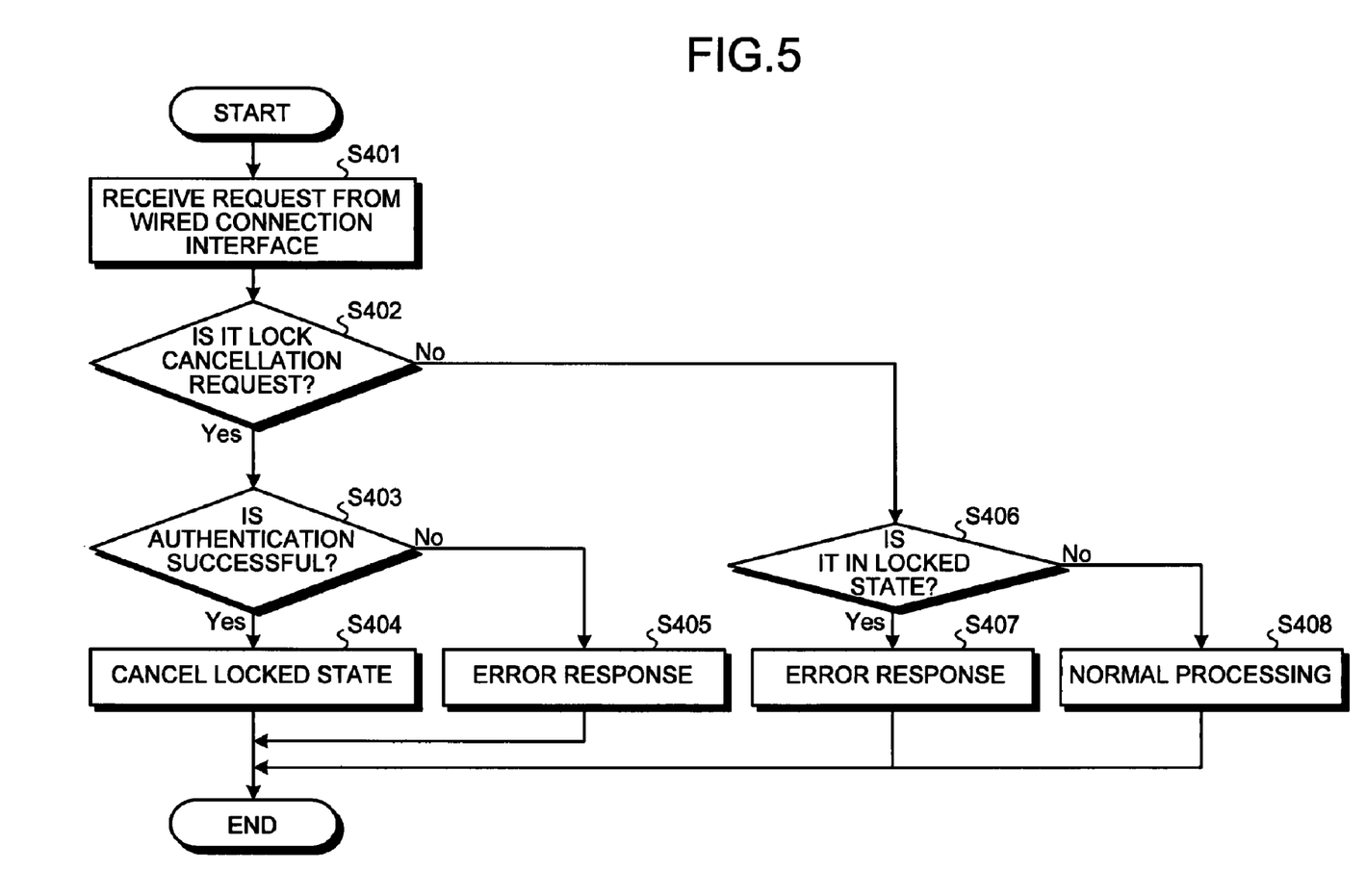
FIG. 5 is a flowchart of a process procedure performed by the non-contact IC shown in FIG. 1 when the non-contact IC performs authentication using an internal authentication mechanism at the time of canceling a lock.

FIG. 5 is a flowchart of a process procedure when the non-contact IC 110 shown in FIG. 1 performs authentication processing using an internal authentication mechanism at the time of canceling the lock.

As shown in FIG. 5, when the non-contact IC 110 receives the request from the application executing unit 120 (step S401), it identifies the type of the request. If the request is a lock cancellation request (step S402: Yes), the non-contact IC 110 requests the authentication mechanism to authenticate the authentication information included in the lock cancellation request. When authentication is successful (step S403: Yes), the non-contact IC 110 cancels its own locked state (step S404). When authentication is unsuccessful (step S403: No), the non-contact IC 110 sends an error response to the application executing unit 120 (step S405).

When the request received from the application executing unit 120 is not a lock cancellation request (step S402: No), if the non-contact IC 110 is locked (step S406: Yes) it sends an error response to the application executing unit 120 (step S407), and if it is not locked (step S406: No), it executes normal processing according to the content of the request (step S408).

Figure 6:
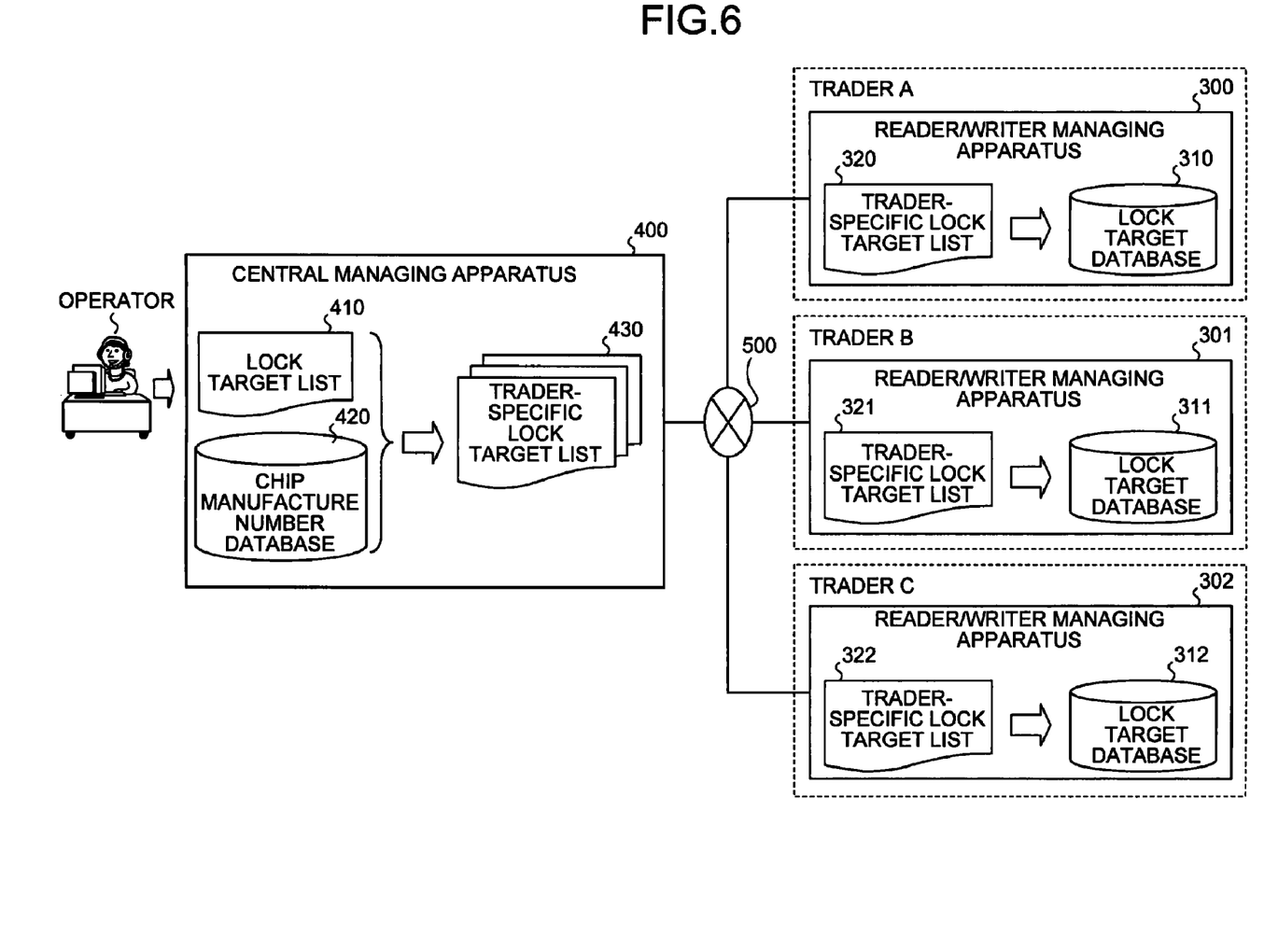
FIG. 6 is an explanatory diagram of a mechanism for updating a lock target database shown in FIG. 2.

A mechanism for updating the lock target database 310 in the use restriction method shown in FIG. 2 will be explained next. FIG. 6 is an explanatory diagram of a mechanism for updating the lock target database 310 in the use restriction method shown in FIG. 2.

As shown in FIG. 6, the reader/writer managing apparatus 300 including the lock target database 310 is connected to a central managing apparatus 400 via a network 500 such as the Internet. A reader/writer managing apparatus 301 and a reader/writer managing apparatus 302 that are identical to the reader/writer managing apparatus 300 are connected to the central managing apparatus 400 via the network 500. Any number of reader/writer managing apparatuses can be connected to the central managing apparatus 400.

The central managing apparatus 400 distributes various types of management information relating to the reader/writer managing apparatus 300 and the like that are connected via the network 500. When a user loses a mobile telephone set including a non-contact IC due to loss or theft, and calls to request that the use of the non-contact IC of the mobile telephone set be restricted, the operator who receives his call registers the chip manufacture number of his non-contact IC in a lock target list 410 of the central managing apparatus 400.

Figure 7:
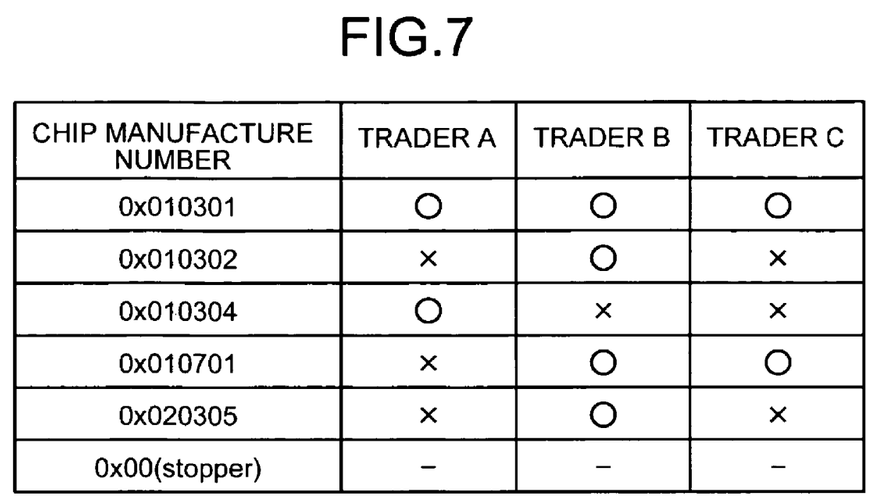
FIG. 7 is a sample diagram of an example of the data configuration of a chip manufacture number database.

The central managing apparatus 400 cross-checks an updated lock target list 410 with a chip manufacture number database 420, and generates a trader-specific lock target list 430. FIG. 7 is a sample diagram of an example of the data configuration of the chip manufacture number database 420. As shown in FIG. 7, the chip manufacture number database 420 stores the corresponding relationships between chip manufacture numbers and traders who can use the non-contact ICs having those chip manufacture numbers.

The traders who can use the non-contact ICs differ according to the supplier who supplies the device that includes the non-contact IC and their contract contents. The chip manufacture number database 420 includes the corresponding relationship for each chip manufacture number.

For example, since the chip manufacture number "0x01301" corresponds to all traders A, B, and C, when this chip manufacture number exists in the lock target list 410, the same number is output to all trader-specific lock target lists 430. Since the chip manufacture number "0x010302" corresponds only to trader B, when this chip manufacture number exists in the lock target list 410, the same number is output only to the trader-specific lock target list 430 for trader B.

The trader-specific lock target lists 430 generated by the central managing apparatus 400 are distributed via the network 500 to the reader/writer managing apparatuses of the corresponding traders. For example, the trader-specific lock target list 430 for trader A is distributed to the reader/writer managing apparatus 300, where it becomes a trader-specific lock target list 320. Similarly, the trader-specific lock target list 430 for trader B is distributed to the reader/writer managing apparatus 301 where it becomes a trader-specific lock target list 321, and the trader-specific lock target list 430 for trader C is distributed to the reader/writer managing apparatus 302 where it becomes a trader-specific lock target list 322.

The distributed trader-specific lock target lists 320 to 322 are converted to the lock target databases 310 to 312, respectively. The lock target databases 310 to 312 are configured to allow high-speed searching.

Figure 8:
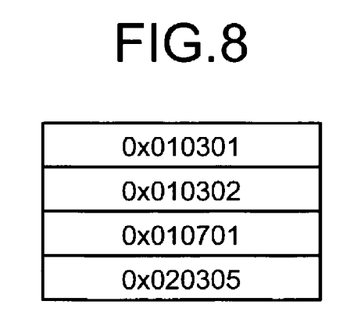
FIG. 8 depicts an example of a trader-specific lock target list.

FIG. 8 is a sample diagram of an example of the trader-specific lock target list 320. As shown in FIG. 8, the trader-specific lock target list 320 is a simple list of chip manufacture numbers and its data configuration is not suitable for high-speed searching.

Figure 9:
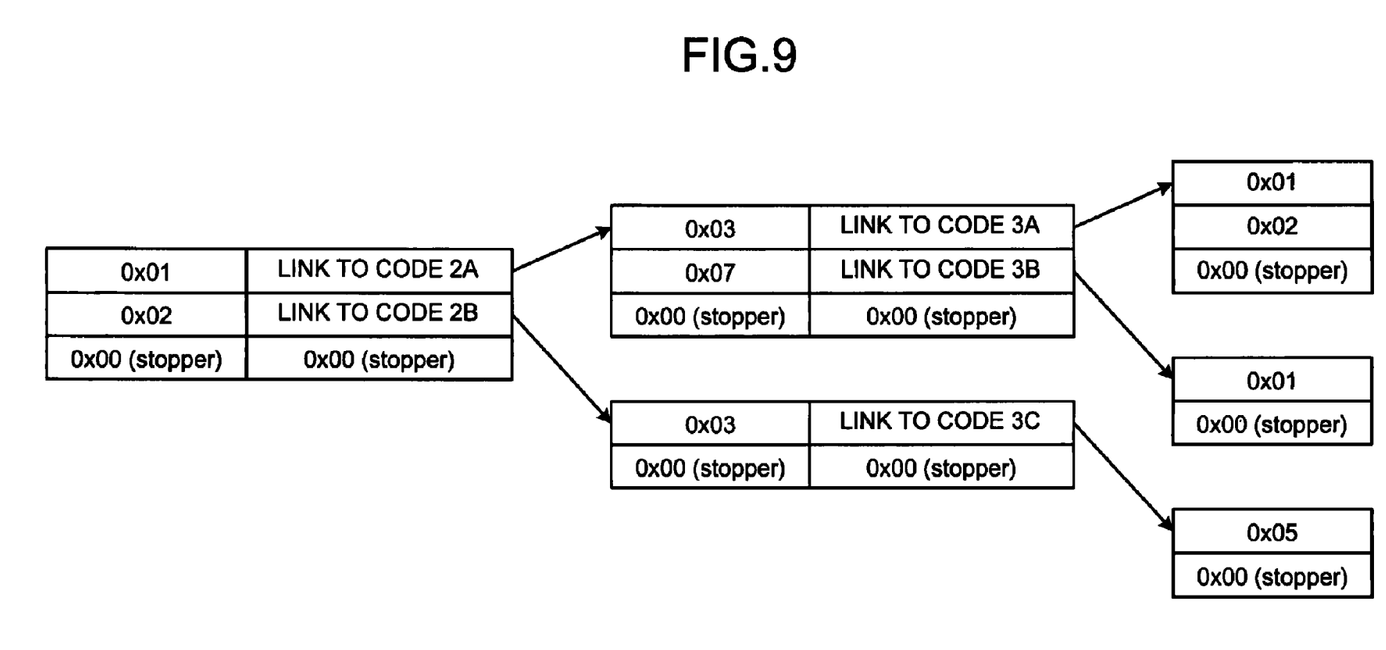
FIG. 9 depicts an example of data configuration of the lock target database.

FIG. 9 is a sample diagram of an example of the data configuration of the lock target database 310. FIG. 9 is an example when the trader-specific lock target list 320 of FIG. 8 is converted to the lock target database 310.

As shown in FIG. 9, the lock target database 310 divides the chip manufacture numbers into data of predetermined sizes (into three codes 1 to 3 per two bytes in this example), and the divided data are linked from the top in a tree formation. This configuration enables a greater amount of data to be searched at high speed than in the simple list configuration shown in FIG. 8.

A process procedure performed by the reader/writer managing apparatus 300 at the time of searching the lock target database 310 to determine whether the non-contact IC can be used, when the lock target database 310 has a configuration such as that shown in FIG. 9, will be explained.

Figure 10:
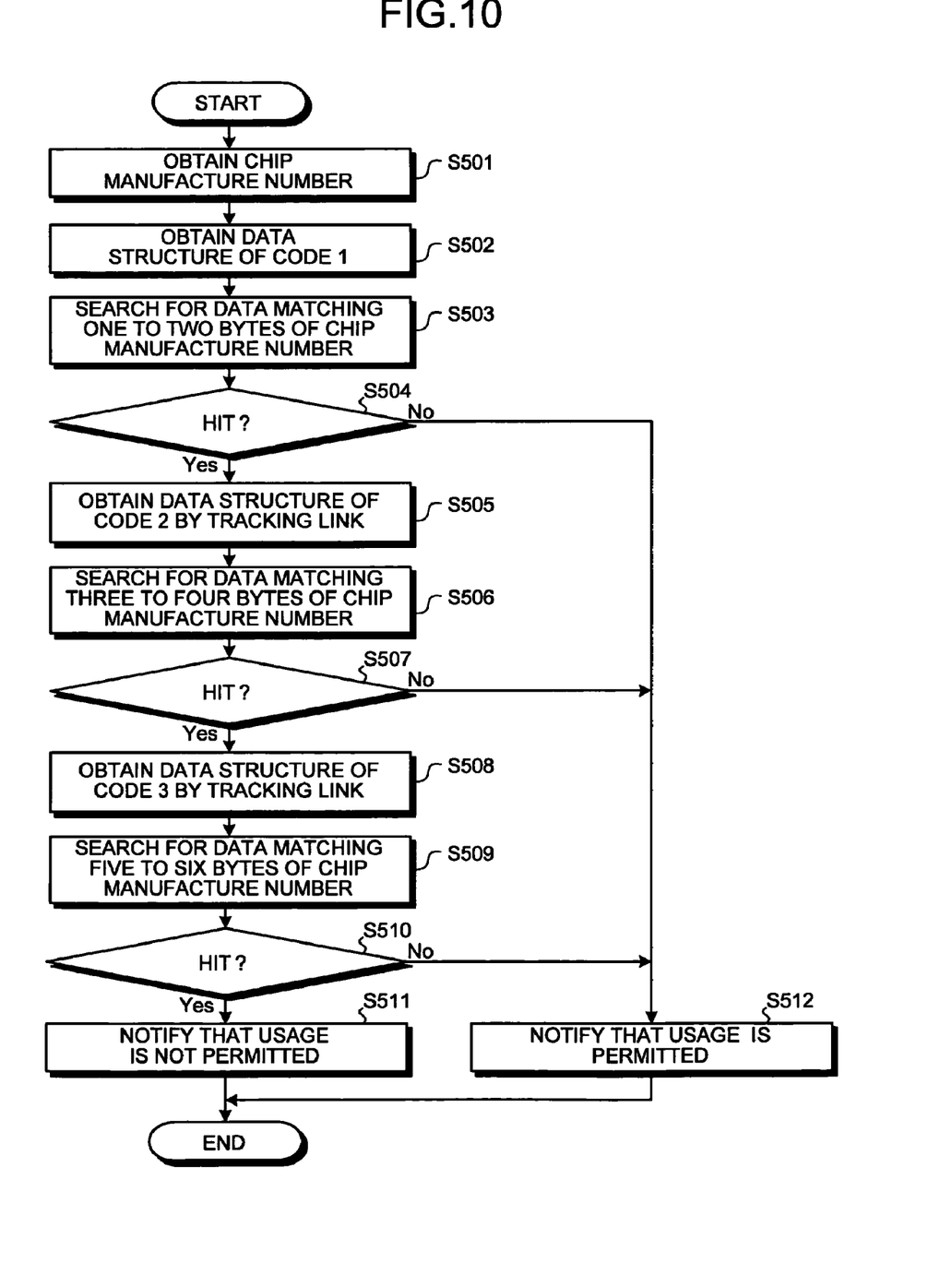
FIG. 10 is a flowchart of a process procedure performed by a reader/writer managing apparatus when determining possibility of use.

FIG. 10 is a flowchart of a process procedure in the reader/writer managing apparatus 300 for determining whether the non-contact IC can be used. As shown in FIG. 10, when the chip manufacture number being searched is obtained (step S501), the reader/writer managing apparatus 300 obtains the data structure of code 1, being the uppermost code in the tree formation (step S502), and searches for data that matches one to two bytes of the chip manufacture number being searched (step S503).

When matching data exists (step S504: Yes), the reader/writer managing apparatus 300 tracks the link of the matching data to obtain the data structure of code 2 in the next rank (step S505) and searches for data that matches three to four bytes of the chip manufacture number being searched (step S506).

When matching data exists (step S507: Yes), the reader/writer managing apparatus 300 tracks the link of the matching data to obtain the data structure of code 3 rank (step S508) and searches for data that matches five to six bytes of the chip manufacture number being searched (step S509).

When matching data exists (step S510: Yes), the reader/writer managing apparatus 300 transmits a notification that the non-contact IC cannot be used to the source that requested the determination (step S511). If no matching data exists in step S504, step S507, or step S510 (step S504: No, step S507: No, or step S510: No), the reader/writer managing apparatus 300 transmits a notification that the non-contact IC can be used to the source that requested the determination (step S512).

The data configuration of the lock target database 310 does not need to be the one shown in FIG. 9, and it is possible to utilize the data configuration that is most suitable with regard to the number of data, the data storage capacity, and the required search speed.

While the above embodiment has described a mechanism that registers the chip manufacture numbers of non-contact ICs whose use is to be restricted, the same mechanism can be used when canceling restrictions on the use of the non-contact ICs.

Specifically, an operator receives a use restriction cancellation request from a user who has once again picked up a mobile telephone set including the non-contact IC, and deletes the chip manufacture number of the non-contact IC from the lock target list 410. A trader-specific lock target list 430 is then generated based on the updated lock target list 410 and the chip manufacture number database 420, and is distributed to the reader/writer managing apparatuses of the corresponding traders.

The trader-specific lock target list 430 can be data that includes all the chip manufacture numbers of non-contact ICs for which use restrictions are required by that trader, or differential data for updating. The trader-specific lock target lists 430 can be distributed in real time whenever the lock target list is updated, or processed in batches at predetermined intervals.

As described above, in this embodiment, when the non-contact IC receives a use restriction request from a reader/writer, a command that its own use is to be restricted is stored in the non-contact IC, and, when such a record is stored, makes no communications with the reader/writer. Therefore, use of the non-contact IC can be restricted irrespective of the states of related devices other than the reader/writer.

When use of the non-contact IC is not restricted, services can be received merely by holding the non-contact IC up to the reader/writer, with no loss in convenience.

According to an aspect of the present invention, it becomes possible to restrict the use of the non-contact IC irrespective of the states of related devices other than the reader/writer.

When the use of the non-contact IC is not restricted, services can be received merely by holding the non-contact IC up to the reader/writer. Therefore, there is no loss of convenience when using the non-contact IC.

According to another aspect of the present invention, restricting the use of the non-contact IC can be cancelled even when no information is being exchanged with the reader/writer.

According to still another aspect of the present invention, exchange of information via wired connection can be restricted without losing the use restriction cancellation unit.

According to still another aspect of the present invention, illicit use restriction cancellation requests can be discarded.

According to still another aspect of the present invention, use of the non-contact IC can be restricted merely by using the non-contact IC and the reader/writer that is an essential apparatus for receiving services with the non-contact IC.

According to still another aspect of the present invention, a non-contact IC can be set to the state of restricted use irrespective of the states of relating devices other than the reader/writer.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-contact integrated circuit (IC) comprising:
a wireless communications unit configured to exchange information with a reader/writer by wireless communication;
a storage unit configured to store therein information;
a restriction setting unit configured to, upon receiving, from the reader/writer, a use restriction request indicative of restricting use of the non-contact IC, store in the storage unit a restriction command for setting the non-contact IC to a state of restricted use, the reader/writer transmitting the use restriction request based on an identification number of the non-contact IC read by the reader/writer; and
a controller configured to, when the restriction command is present in the storage unit, control the wireless communications unit so that the wireless communications unit does not exchange information with the reader/writer.

2. The non-contact IC according to claim 1, further comprising:
a wired communications unit configured to perform wired communication with another apparatus; and
a restriction canceling unit configured to, upon receiving a use restriction cancellation request indicative of canceling restriction on use of the non-contact IC from the another apparatus via the wired communication unit, store in the storage unit a non-restriction command for setting the non-contact IC to a state of unrestricted use, wherein
the controller allows, when the non-restriction command is present in the storage unit, the wireless communications unit to exchange information with the reader/writer.

3. The non-contact IC according to claim 2, wherein, when the restriction command is present in the storage unit, the controller controls the wired communications unit so that the wired communications unit can receive only the use restriction cancellation request from the another apparatus.

4. The non-contact IC according to claim 2, wherein the use restriction cancellation request includes authentication information, the non-contact IC further comprises an authenticating unit configured to check authentication of the use restriction cancellation request based on the authentication information, wherein the restriction canceling unit stores the non-restriction command in the storage unit only when the authenticating unit decides that the use restriction cancellation request is authentic.

5. An information processing apparatus comprising a non-contact integrated circuit (IC), the non-contact IC including a wireless communications unit configured to exchange information with a reader/writer by wireless communication;

a storage unit configured to store therein information;

a restriction setting unit configured to, upon receiving, from the reader/writer, a use restriction request indicative of restricting use of the non-contact, store in the storage unit a restriction command for setting the non-contact IC to a state of restricted use, the reader/writer transmitting the use restriction request based on an identification number of the non-contact IC read by the reader/writer; and a controller configured to, when the restriction command is present in the storage unit, control the wireless communications unit so that the wireless communications unit does not exchange information with the reader/writer.

6. The information processing apparatus according to claim 5, the non-contact IC further comprising:

a wired communication unit configured to perform wired communication with the information processing apparatus; and a restriction canceling unit configured to, upon receiving a use restriction cancellation request indicative of canceling restriction on use of the non-contact IC from the information processing apparatus via the wired communication unit, store in the storage unit a non-restriction command for setting the non-contact IC to a state of unrestricted use, wherein the controller allows, when the non-restriction command is present in the storage unit, the wireless communications unit to exchange information with the reader/writer.

7. The information processing apparatus according to claim 6, wherein, when the restriction command is present in the storage unit, the controller controls the wired communications unit so that the wired communications unit can receive only the use restriction cancellation request from the information processing apparatus.

8. The information processing apparatus according to claim 6, wherein the use restriction cancellation request includes authentication information, the non-contact IC further comprises an authenticating unit configured to check authentication of the use restriction cancellation request based on the authentication information, wherein the restriction canceling unit stores the non-restriction command in the storage unit only when the authenticating unit decides that the use restriction cancellation request is authentic.

9. A use restriction method of controlling use of a non-contact integrated circuit (IC), the non-contact IC configured to exchange information with a reader/writer by wireless communication, comprising:

the reader/writer determining, based on restriction information, whether use of the non-contact IC is to be restricted;

the reader/writer transmitting a command to the non-contact IC when it is determined at the determining that the use of the non-contact IC is to be restricted; and the non-contact IC setting itself in a state of restricted use upon receiving the command.

* * * * *